(12) United States Patent
Cohen

(10) Patent No.: US 8,490,886 B2
(45) Date of Patent: Jul. 23, 2013

(54) MODULATING BOILER SYSTEM

(75) Inventor: Kenneth W. Cohen, Fort Lee, NJ (US)

(73) Assignee: Westcast, Inc., Westfield, MA (US)

( * ) Notice: Subject to any disclaimer, the term of this patent is extended or adjusted under 35 U.S.C. 154(b) by 973 days.

(21) Appl. No.: 11/770,007

(22) Filed: Jun. 28, 2007

(65) Prior Publication Data

US 2009/0001186 A1 Jan. 1, 2009

(51) Int. Cl.
*F24D 1/00* (2006.01)
*G05D 23/00* (2006.01)
*F24D 19/10* (2006.01)

(52) U.S. Cl.
USPC ............... 237/8 A; 237/8 R; 237/19; 237/12; 236/20 R; 236/46 R; 126/344; 122/4 R; 700/278; 700/296; 700/306

(58) Field of Classification Search
USPC .................. 237/8 R, 19, 8 A, 12; 236/20 R, 236/46 R; 126/344; 122/4 R; 700/278, 296, 700/306
See application file for complete search history.

(56) References Cited

U.S. PATENT DOCUMENTS

| | | | | |
|---|---|---|---|---|
| 2,404,597 A | * | 7/1946 | McClain | 237/8 R |
| 3,064,103 A | * | 11/1962 | Biermann et al. | 236/68 B |
| 3,585,595 A | * | 6/1971 | Slavin et al. | 370/424 |
| 4,293,028 A | * | 10/1981 | Knoll | 236/46 R |
| 4,356,962 A | * | 11/1982 | Levine | 236/46 F |
| 4,387,763 A | * | 6/1983 | Benton | 236/1 EA |
| 4,388,692 A | * | 6/1983 | Jones et al. | 700/278 |
| 4,460,123 A | * | 7/1984 | Beverly | 236/46 R |
| 4,509,585 A | * | 4/1985 | Carney et al. | 236/46 R |
| 4,516,720 A | | 5/1985 | Chaplin | |
| 4,620,667 A | | 11/1986 | Vandermeyden et al. | |
| 4,639,876 A | * | 1/1987 | Deeds | 700/276 |
| 4,671,457 A | * | 6/1987 | Berkhof | 236/46 R |
| 4,798,971 A | * | 1/1989 | Gravely | 307/141 |
| 4,921,163 A | * | 5/1990 | Viessmann | 236/46 R |
| 4,971,136 A | * | 11/1990 | Mathur et al. | 700/291 |
| 5,002,226 A | * | 3/1991 | Nelson | 236/68 B |
| 5,115,967 A | * | 5/1992 | Wedekind | 236/46 R |
| 5,115,968 A | * | 5/1992 | Grald | 700/278 |
| 5,244,146 A | * | 9/1993 | Jefferson et al. | 236/46 F |
| 5,244,148 A | * | 9/1993 | Vandermeyder | 236/46 R |
| 5,426,620 A | * | 6/1995 | Budney | 368/10 |
| 5,621,638 A | * | 4/1997 | Afshari | 700/28 |
| 5,660,328 A | * | 8/1997 | Momber | 236/46 R |
| 5,682,329 A | * | 10/1997 | Seem et al. | 700/276 |
| 5,687,139 A | * | 11/1997 | Budney | 368/10 |
| 5,692,676 A | | 12/1997 | Walker | |
| 5,769,314 A | * | 6/1998 | Drees et al. | 236/49.3 |
| 6,389,331 B1 | * | 5/2002 | Jensen et al. | 700/276 |
| 6,402,043 B1 | * | 6/2002 | Cockerill | 700/278 |
| 6,840,198 B2 | * | 1/2005 | Kang et al. | 122/5.51 |
| 6,892,547 B2 | * | 5/2005 | Strand | 236/44 C |
| 7,031,880 B1 | * | 4/2006 | Seem et al. | 700/276 |
| 7,099,748 B2 | * | 8/2006 | Rayburn | 700/276 |
| 7,770,806 B2 | * | 8/2010 | Herzon et al. | 236/1 C |
| 7,819,334 B2 | * | 10/2010 | Pouchak et al. | 237/8 A |

(Continued)

*Primary Examiner* — Steven B McAllister
*Assistant Examiner* — Phillip E Decker
(74) *Attorney, Agent, or Firm* — McCormick, Paulding & Huber LLP

(57) ABSTRACT

A modulating boiler system for heating a structure including a controller, a boiler operatively connected to the controller, and a thermostat operatively connected to the controller and boiler. The controller assesses a level of thermostat activity over a predetermined measuring period and adjusts the boiler in response to the level of activity to increase the boiler's efficiency.

3 Claims, 2 Drawing Sheets

U.S. PATENT DOCUMENTS

| | | |
|---|---|---|
| 2004/0112970 A1* | 6/2004 | Feldmeth et al. ............ 236/20 R |
| 2005/0159844 A1* | 7/2005 | Sigafus et al. ................ 700/282 |
| 2008/0015739 A1* | 1/2008 | Wacker ......................... 700/276 |
| 2008/0141047 A1* | 6/2008 | Riviere-Cazaux ............ 713/300 |
| 2008/0314999 A1* | 12/2008 | Strand ......................... 236/20 R |
| 2009/0199019 A1* | 8/2009 | Hongisto et al. ............... 713/300 |
| 2012/0273581 A1* | 11/2012 | Kolk et al. ................... 236/91 D |

* cited by examiner

MODULATING BOILER SYSTEM

FIELD OF THE INVENTION

The present invention relates generally to a modulating boiler system, and more particularly to a modulating boiler system in which energy input to a boiler is reduced through the use of moving averages of the amount of time that the boiler's thermostat is on.

BACKGROUND OF THE INVENTION

Known boiler systems typically employ an outdoor sensor to assess the difference between the outdoor ambient air temperature and the temperature of the air inside a structure to be heated. The outdoor sensor responds to the outdoor air temperature to adjust the set point temperature of the boiler. The set point temperature is decreased in warmer weather and in colder weather the set point is increased. This technique is referred to as "outdoor reset."

There are, however, limitations to using outdoor reset systems. For example, the outdoor sensor requires a puncture through the wall. The outdoor sensor must also be positioned such that it reflects the average temperature of the outside air around the structure to be heated. Significantly, the sensor must not be influenced by the sun's radiation, snow, ice, or other heat sources. Sensors must also be calibrated periodically to ensure proper performance. Additionally, the "reset ratio", i.e., the change in boiler set point for a change in outdoor temperature must be programmed into the boiler control. Since there is no "feedback", the reset ratio is typically set very conservatively to ensure sufficient heat is available to maintain home comfort and the effectiveness of the outdoor control to reduce energy consumption is severely limited.

Furthermore, sources of heat gain or loss not related to outdoor air temperature, e.g., open windows and heat generated by human occupation, are not captured by the sensor. Constraining the set point of a boiler may compromise comfort in systems where a minimum boiler water temperature is necessary to ensure comfort. Finally, outdoor reset systems cannot be used with fixed set point boilers.

In view of the above, outdoor reset sensors often obtain erroneous measurements of outdoor air temperature. If the outdoor air measurement is erroneous, the set point established for the boiler can result is insufficient heat to satisfy the thermostat(s).

With the foregoing problems and concerns in mind, it is the general object of the present invention to provide a modulating boiler system in which the energy input to a boiler is reduced, and efficiency thereby increased, without the limitations of an outdoor reset system or the use of an outdoor air sensor.

SUMMARY OF THE INVENTION

It is an object of the present invention to provide a modulating boiler system with an increased efficiency.

It is an additional object of the present invention to provide a modulating boiler system that is capable of reducing energy input to a boiler to increase the boiler's efficiency.

It is a further object of the present invention to provide a modulating boiler system that reduces energy input to a boiler to increase the boiler's efficiency without the drawbacks of known systems.

It is yet another object of the present invention to provide a modulating boiler system that reduces energy input of a boiler to increase the boiler's efficiency without the need for an ambient air temperature sensor.

It is an additional object of the present invention to provide a modulating boiler system that reduces energy input of a boiler to increase the boiler's efficiency by the use of "feedback" to exploit the full turn-down capability of a modulating boiler.

It is an additional object of the present invention to provide a modulating boiler system that reduces energy input of a boiler to increase the boiler's efficiency through the use of moving averages of the amount of time that the boiler's thermostat is on.

This and other objectives of the present invention, and their preferred embodiments, shall become clear by consideration of the specification, claims and drawings taken as a whole.

DETAILED DESCRIPTION OF THE PREFERRED EMBODIMENT

In order to maintain a thermostat-controlled space at a specific temperature, the energy supplied, as measured over time, must exactly match the heat loss of the controlled space. If more energy is supplied than heat lost, the space will rise above the thermostat setting. If less energy is supplied, the thermostat temperature setting will not be reached. As described in greater detail below, the present system directly determines the energy and heating needs of a space to increase boiler efficiency to overcome the limitations of known systems.

The present system uses a moving average to calculate the "on-time" of a thermostat over a specific measuring period to directly measure the energy needs of a space. This moving average is used to adjust the boiler energy input to raise or lower the temperature of the boiler water. For example, if the on-time of a thermostat is low over the measuring period, i.e., the heat loss from the zone affected by the thermostat is low, the boiler input is reduced thereby causing a reduction in the boiler water temperature. Moreover, the heat output from hydronic baseboard elements is approximately linear with water temperature. Thus, if the input energy from the boiler is reduced, equilibrium will occur at lower water temperature.

The reduced temperature of the boiler water results in a slower increase in room temperature and increases the on-time for the thermostat. A longer thermostat on-time over the measuring period increases the moving average until a stable condition is achieved. Increasing boiler load due to colder outdoor temperatures causes increases in thermostat cycles, boiler on-time, and thus the moving average. This "feedback" approach ensures sufficient heat is always available.

As will be appreciated, this proportional control acts to increase the thermostat cycle time and thus the boiler on-time by reducing input to the boiler during periods of reduced energy usage, with a consequent reduction in system losses, increased boiler efficiency and improved comfort.

Figure 1:
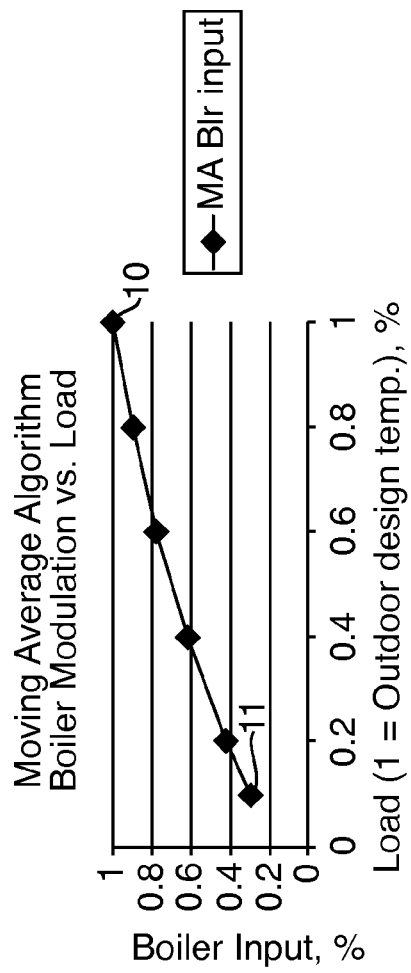
FIG. 1 is a chart depicting a plot of boiler inputs achieved at multiple loads through use of a moving average algorithm of the present modulating boiler system.

This is shown in FIG. 1, which graphically illustrates a plot of energy input 10 at various loads achieved through a moving average algorithm of the present invention. Load is represented on the x-axis and boiler energy input on the y-axis. As depicted, the moving average of the present system results in reduced boiler energy input to a boiler at reduced boiler loads. For example, at a boiler load of approximately ten percent 11, the boiler energy input is reduced to about thirty percent. As will be appreciated, the algorithm results in increased input as the boiler load is increased.

The moving average is an important aspect of the present invention. By basing calculations on thermostat on-time, as opposed to temperature, the present system does not require a sensor arranged to detect ambient air temperature. Further, the present system does not have the inherent limitations of outdoor reset systems such as susceptibility to error from outdoor heat sources, e.g., the sun, snow and ice. Moreover, given that the system of the present invention is wholly self-contained, all sources of energy gain/loss are reflected in thermostat cycling time. In addition, the present system ensures sufficient excess energy is maintained to ensure that the thermostat zone can respond to unanticipated load changes.

In operation, when energy needs are low, the boiler acts as a smaller more efficient unit capable of achieving required temperatures without the imposed constraints of an outdoor reset control. More specifically, the present system reduces the boiler water temperature on warmer days so that the boiler is effectively "smaller" allowing the thermostat to be satisfied with lower water temperatures than those required on colder days.

The present system operates by sampling the thermostat state, either on or off, at a high enough rate to accurately capture all thermostat cycles. An exponential moving average ("EMA") is then created for the measuring period, which is preferably a one-hour interval. To improve accuracy a second EMA is created using the initial EMA as input. The value of the EMA is between 0 and 1. When a boiler start is demanded, the boiler energy input is determined by the EMA value multiplied by the maximum BTU set for the boiler. When more than one thermostat is connected to the control, the highest EMA is chosen to determine energy input.

Figure 2:
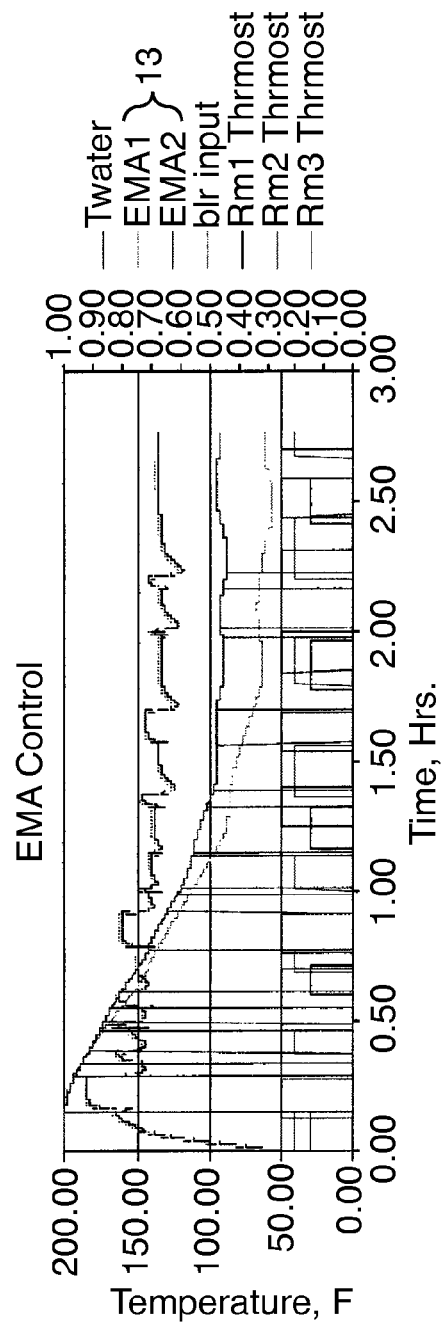
FIG. 2 is a chart depicting use of an exponential moving average of the present invention to reduce boiler input in a multiple thermostat setting.

This is shown in FIG. 2, which graphically illustrates how the present system uses an EMA 13 to reduce boiler energy input in a multiple thermostat setting. The highest EMA 13 is chosen between multiple connected thermostats, which ensures the zone with the greatest energy need is satisfied. As depicted, the EMA 13 reduces boiler energy input to approximately forty-eight percent at a twenty percent external load.

Figure 3:
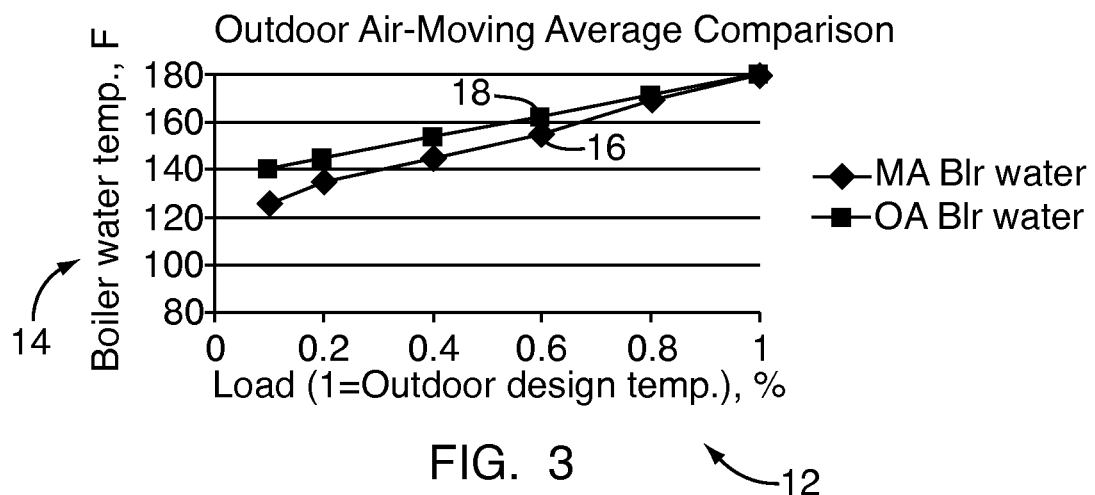
FIG. 3 is a chart depicting a plot of boiler water temperatures achieved at multiple loads through use of a modulating boiler system of the present invention compared to a plot of boiler water temperatures obtained through use of a system assessing outdoor air temperature.

FIG. 3 graphically illustrates the efficacy of the inventive moving average system compared to a known outdoor reset system. The figure depicts boiler load 12 on the x-axis and boiler water temperature 14 on the y-axis. A plot of boiler water temperature 16 using the inventive moving average system is juxtaposed with a plot of the boiler water temperature 18 derived from an outside air system.

As will be appreciated, with an increasing load on the boiler, the moving average system functions to increase the boiler water temperature in a similar fashion to the outdoor reset system. With the present system, however, lower boiler water temperatures are attained resulting in higher efficiencies than possible with the outdoor reset system. For example, at a load of 0.2, is at about 132° F. with the moving average system while the boiler water using the outdoor air system is at about 142° F.

Figure 4:
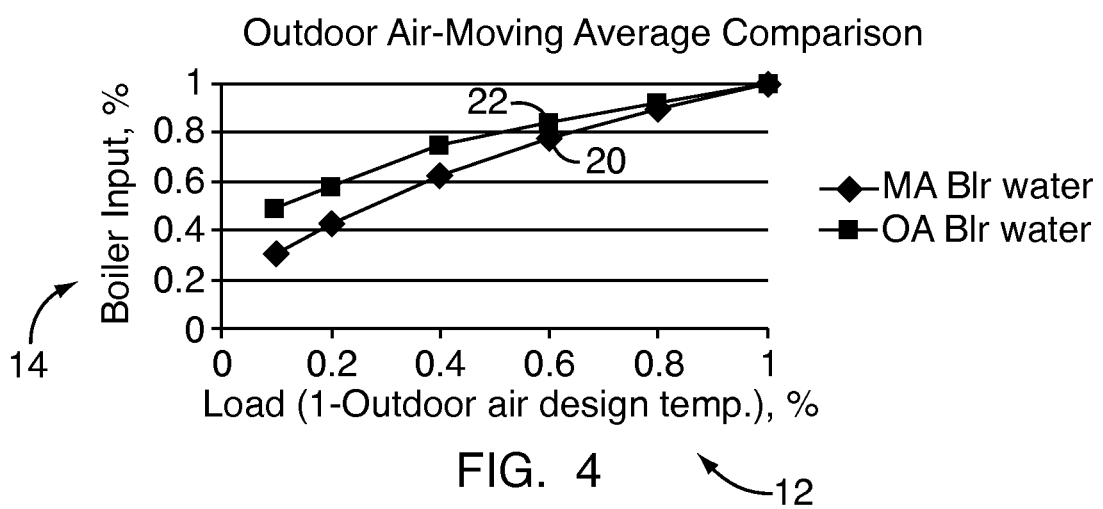
FIG. 4 is a chart depicting a plot of boiler inputs achieved at multiple loads through the modulating boiler system of FIG. 3 compared to a plot of boiler inputs obtained through use of a system assessing outdoor air temperature.

Likewise, FIG. 4 illustrates the benefits of the moving average system compared to a known outdoor reset system. In FIG. 4, boiler energy input is represented on the y-axis and load on the x-axis. A plot of boiler energy input 20 achieved through the inventive moving average system is contrasted with boiler input 22 that results from use of an outdoor reset system. As shown, lower boiler energy input is possible with the present moving average system resulting in higher efficiencies than possible with the outdoor reset system. For example, at a load of 0.1, boiler energy input using the moving average system is about 0.3 or 30%. In contrast, with prior art outdoor reset systems, the boiler energy input at this same load is about 0.5 or 50%.

It is therefore an important aspect of the present invention that the control of the modulating boiler system described herein does not indirectly rely upon an outdoor ambient-air sensor. Rather, the present invention directly determines the energy and heating needs of an enclosure by determining the boiler's moving average of thermostat on-time for the enclosure. By directing sensing the on-time or cycles of the boiler, the control system of the present invention is capable of altering the input energy of the boiler itself so as to optimize the size of the boiler (that is, the BTU output of the boiler), as well as responding to the on-time thereof, thus increasing the overall efficiency of the system. The control system does not impose limitations on water temperature, thus allowing the instantaneous needs of the system to be satisfied.

Moreover, by directly controlling the size of the boiler, and by selectively controlling its time of operation per unit time, the modulating boiler system of the present invention will cause the boiler to experience less on/off cycles, thus reducing wear and tear on the boiler assembly, and reducing maintenance concerns correspondingly.

Figure 5:
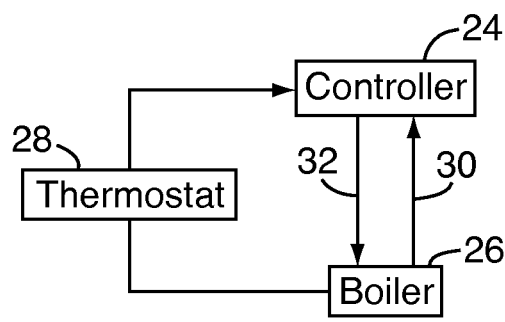
FIG. 5 is a simplified schematic diagram of a modulating boiler system in accordance with an embodiment of the present invention.

Referring now to FIG. 5, a preferred embodiment of a modulating boiler system of the present invention is shown. The system includes a controller 24 that is connected to a boiler 26 and a thermostat 28. As will be appreciated, the moving average algorithm of the present invention resides in, and is run by, software contained in the controller 24. The controller 24 receives data from the boiler 26 regarding the temperature of the boiler water via a data link 30. The controller 24 can also increase or decrease the temperature of the boiler water through a control link 32 depending upon thermostat on-time. As such, the controller 24, in addition to the boiler 26, is connected to a thermostat 28 so that it may receive data regarding its on-time.

In use, the controller 24, via the inventive algorithm, creates an exponential moving average of thermostat on-time by measuring the time the thermostat 28 is on over, for example, a one-hour period. The controller 24 will then determine boiler input by multiplying the exponential moving average by the maximum BTU output of the boiler 26. After this determination has been made, the controller 24 will typically alter the boiler input either increasing or decreasing the water temperature of the boiler 26.

Those skilled in the art will appreciate that the present invention is not limited to the embodiments described, but that various modifications and alterations can be made without departing from the scope of the present invention.

I claim:

1. A modulating boiler system, comprising:

a boiler;

a controller in operative connection with said boiler, said controller selectively controlling an input energy provided to said boiler;

a thermostat in operative connection with said controller, said thermostat communicating to said controller a proportional time period reflecting how long said thermostat is requesting heat from said boiler within a predetermined time period, and communicating to said controller a cycle frequency reflecting the number of times said thermostat is requesting heat from said boiler within said predetermined time period; and wherein said input energy is adjusted by said controller in dependence upon said proportional time period and said cycle frequency detected by said controller.

2. The modulating boiler according to claim 1, wherein:

a thermal output of said boiler is adjusted when said input energy is adjusted by said controller.

3. The modulating boiler according to claim 1, wherein:

said predetermined time period is one hour.

* * * * *